Dec. 16, 1930.  W. ZEINDLER  1,785,064
TRUCK
Filed Oct. 4, 1926   2 Sheets-Sheet 1
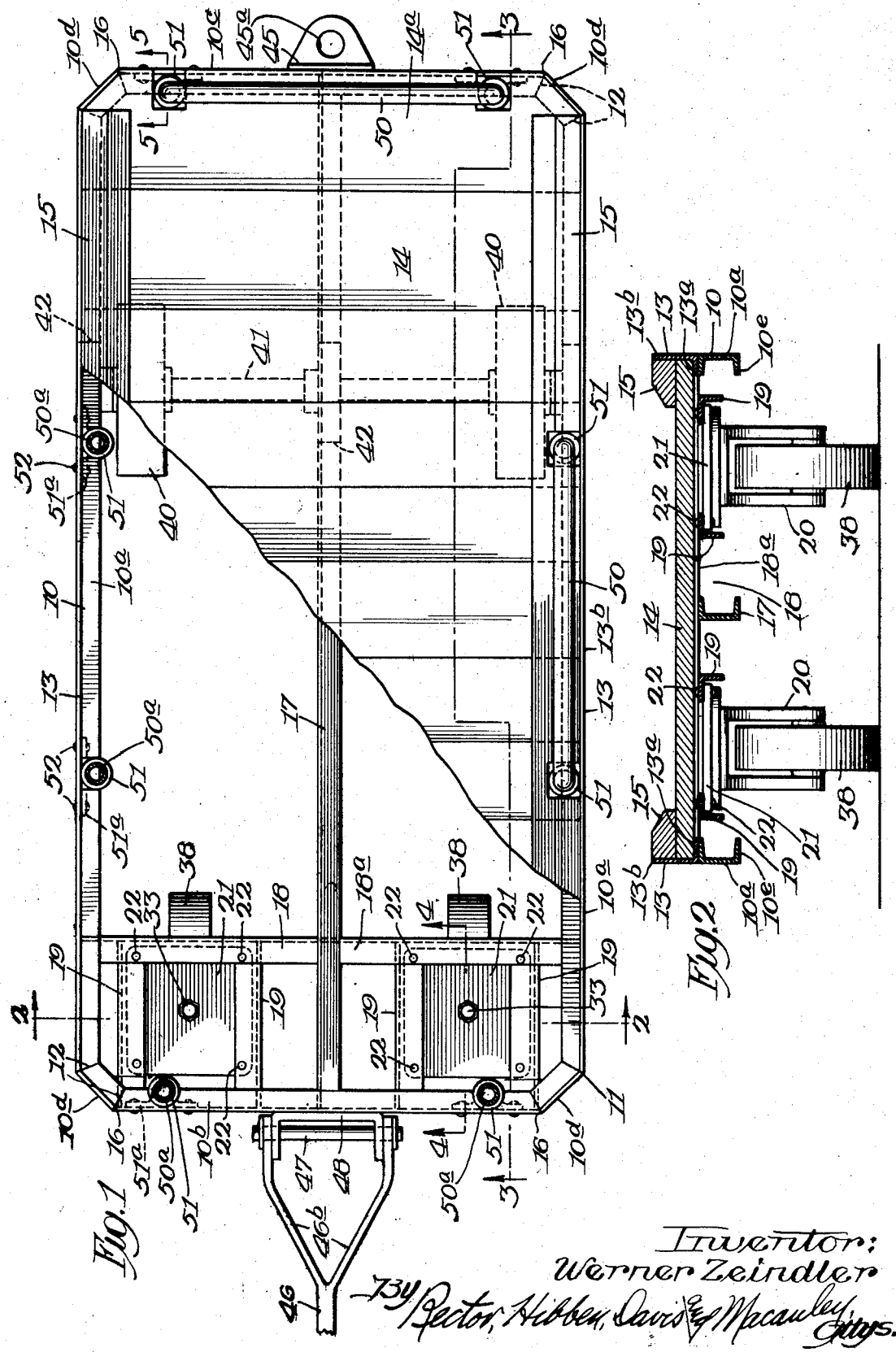
Inventor:
Werner Zeindler
By Rector, Hibben, Davis & Macauley,
Attys.

Dec. 16, 1930.  W. ZEINDLER  1,785,064
TRUCK
Filed Oct. 4, 1926  2 Sheets-Sheet 2
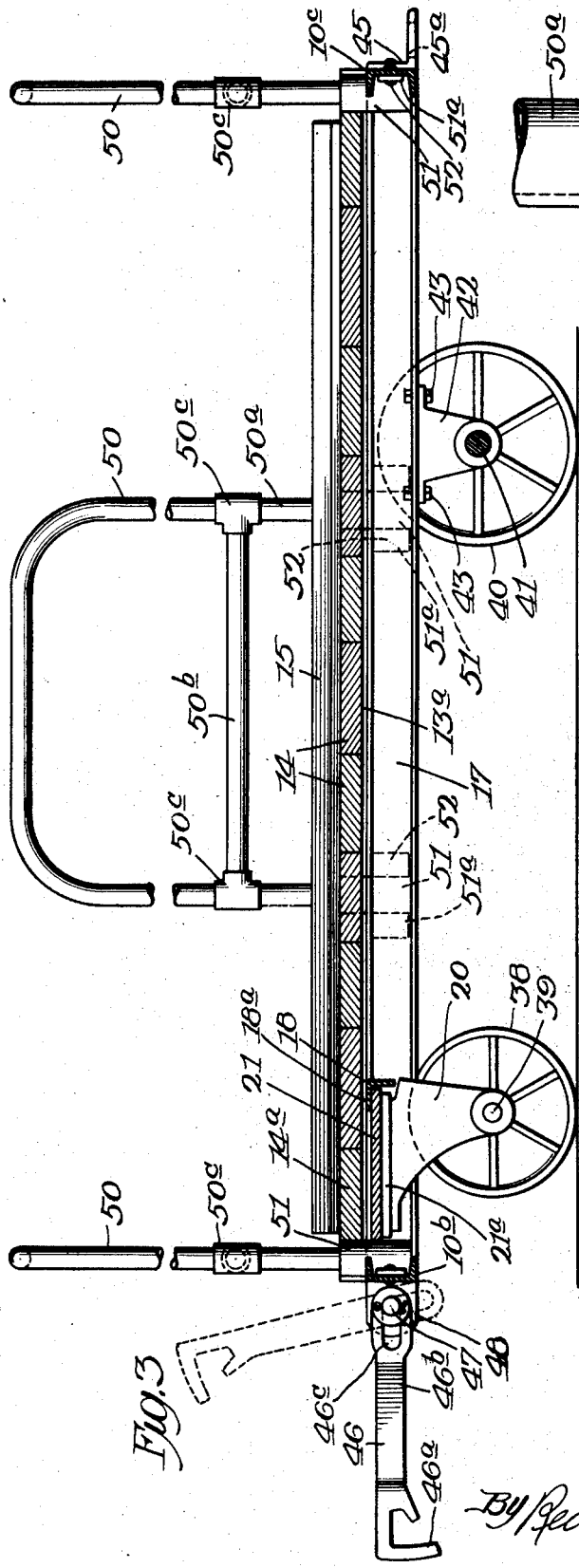
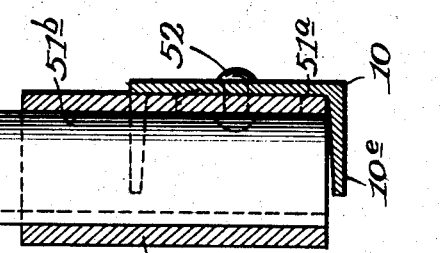
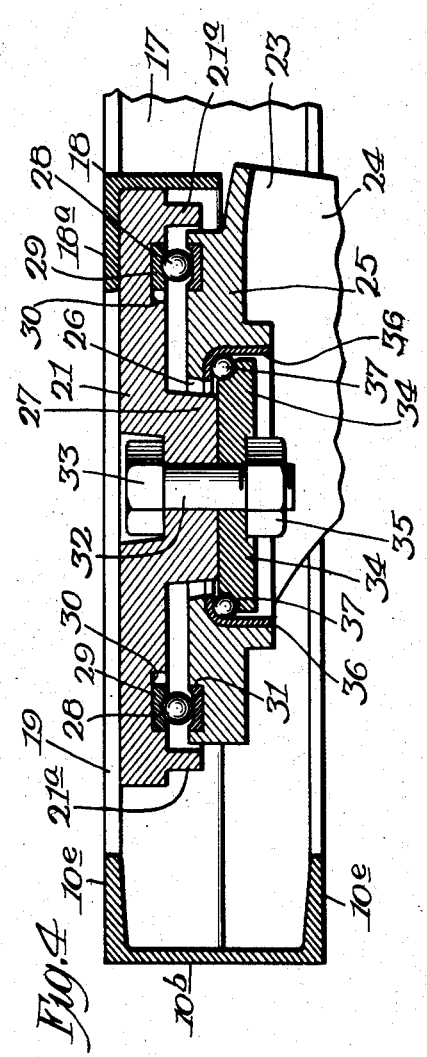
Inventor:
Werner Zeindler
By Rector, Hibben, Davis
and Macauley, Attys.

Patented Dec. 16, 1930

1,785,064

UNITED STATES PATENT OFFICE

WERNER ZEINDLER, OF ALBION, MICHIGAN, ASSIGNOR TO THE SERVICE CASTER & TRUCK CO., OF ALBION, MICHIGAN, A CORPORATION OF MICHIGAN

TRUCK

Application filed October 4, 1926. Serial No. 139,317.

This invention relates to improvements in trucks of the type which are specially adapted for use for transporting freight and baggage, such as the trailer trucks which are usually drawn by electric or gasoline tractors on railway platforms. The principal object of the invention is to provide an improved truck construction embodying a frame having great rigidity and strength. Another object is to provide an improved truck having novel means for attaching the supporting wheels and casters to the frame construction. Still another object is to provide means for mounting the side rails and racks in an improved manner on the supporting frame. Other objects relate to various features of construction and arrangement which will appear more fully hereinafter.

The nature of the invention will be understood from the following specification taken with the accompanying drawings in which one embodiment is illustrated. In the drawings, Fig. 1 shows a top plan view of the improved truck with a portion of the top floor or platform broken away to reveal the underlying construction of the frame; Fig. 2 shows a transverse section taken on line 2—2 of Fig. 1; Fig. 3 shows a longitudinal section taken on line 3—3 of Fig. 1; Fig. 4 shows an enlarged section taken on line 4—4 of Fig. 1, revealing the construction of one of the castors; and Fig. 5 is a detailed vertical section taken on the line 5—5 of Fig. 1 showing the means for mounting the side posts or racks on the side frames of the truck.

As illustrated in the drawings, the truck comprises a rectangular frame 10 comprising side frame members $10^a$, a front transverse frame member $10^b$ and an end frame member $10^c$, together with the inclined corner members $10^d$, all of which are formed from a continuous length of a metal section, the ends of which are united at one point by welding, as at 11. The metal section forming the frame 10 is preferably of channel cross section having the flanges $10^e$ thereof directed inwardly, these flanges being cut away to the necessary extent at the corners to permit the bending of the section and to form the inclined corner members $10^d$, after which the flanges are united along the edges of the cut portions by welding as shown at 12. In this way a substantially integral frame construction is formed without the use of auxiliary fastening devices such as bolts or rivets. The inclined corner members $10^d$, which are preferably inclined at angles of about 45° to the side frame members $10^a$, serve to engage obstructions which may be encountered during the travel of the truck, thereby deflecting the truck sideways and preventing substantial injury to the construction.

A side rail 13 of angle cross-section is mounted on each of the side frame members $10^a$, one flange $13^a$ of the side rail resting directly on the upper inwardly directed flange of the side frame member, to which the rail is rigidly secured by welding or other fastening means. The other flange of each side rail 13 extends vertically upward in a plane with the web of the underlying side member $10^a$ as shown in Fig. 2, and these side rails 13 are adapted to receive between them the floor boards 14 which form the supporting platform of the truck. The end floor boards $14^a$ are suitably shaped at the corners to conform to the inclined corner members $10^d$ and all of the floor boards may be secured in place by bolts or rivets or other means. Wooden fillers or jambs 15 are mounted longitudinally over the ends of the floor boards 14 within the side rails 13, the top edges of the jambs 15 being flush with the top edges of the vertical flanges of the side rails, the inner edges of the jambs being bevelled downwardly and inwardly as shown in Fig. 2. The ends of the side rails 13 are deflected inwardly to conform to the inclination of the corner members $10^d$, terminating at the inner ends of these corner members as indicated at 16. The top portions of the upwardly directed flanges $13^b$ of the side rails are cut away partially above the corner members $10^d$ so that their upper edges terminate flush with the floor boards 14 at the ends of the wooden jambs 15.

The frame 10 also comprises a longitudinal frame member 17, preferably of channel cross section, which extends throughout the length of the frame and has its ends welded to the front and rear end frame members $10^b$ and 10ᶜ, respectively. The frame also includes a transverse frame member 18 which is located near the front end of the truck, which is preferably of angle cross section having its ends welded to the side frame members 10ᵃ and having an intermediate part of its vertical flange cut away to receive the longitudinal frame member 17 to which the horizontal flange of the member 18 is also welded. This horizontal flange 18ᵃ of the intermediate transverse frame member serves in conjunction with the upper horizontal flange of the front transverse frame member 10ᵇ to support four relatively short longitudinal frame members 19, two of which are located on each side of the central longitudinal frame member 17 with their ends welded to the member 18 and the front transverse frame member 10ᵇ.

Each pair of longitudinal frame members 19 with the intermediate portions of the transverse frame members 18 and 10ᵇ, form a rectangular frame structure which is adapted to rest on and be secured to one of the front casters 20. These casters are preferably of the form illustrated particularly in Fig. 4 where the caster is shown as comprising a top plate 21 which is secured to the longitudinal frame members 19 and to the transverse frame member 18 by means of bolts or rivets 22. Each caster 20 also comprises a lower closing or roller frame 23 including side flanges or frame members 24 and an upper transverse plate 25. The transverse plate 25 is provided with a central opening 26 adapted to be engaged loosely by the downwardly extending centrally located lug 27 formed on the top plate 21 of the caster. The top plate 21 is provided with an annular downwardly extending flange 21ᵃ which overlaps and is located slightly outwardly from the circular upper plate 25 of the housing 23. A series of ball bearings 28 are located between the top plate 21 and the housing 23 and these balls preferably contact with hard metal inserts 29 of annular form which are fitted with a drive fit into annular recesses 30 and 31 which are formed in the top plate 21 and the horizontal plate 25, respectively. The central projection 27 formed on the top plate 21 is provided with a central aperture 32 which is engaged by a bolt 33 and this bolt serves to secure in place a circular hard metal bearing member 34 engaged on its under side by the nut 35. The hard metal member 34 serves in conjunction with the hard metal cup shaped member 36 to form a raceway for an inner series of ball bearings 37 adapted to receive the lateral thrusts on the caster, the vertical thrusts being taken care of by the balls 28. These casters are adapted to turn freely during the travel of the truck and they are located some distance inwardly from the side members 10ᵃ of the truck so that the housings turn laterally about their pivots, the caster wheels 38 which are mounted on the axles 39 of the housings 23, will not project laterally beyond the side frame members of the truck.

Towards the rear end of the frame, the truck is provided with other supporting wheels 40 which are mounted on an axle 41 journalled in the bearing brackets 42 which are secured to the under sides of the side frame members 10ᵃ and of the longitudinal frame member 17 by means of bolts 43. The wheels 40 are located on the inner sides of the side frame members 10ᵃ and the outer brackets 42 extend straight downwardly therefrom so that they will not interfere with adjacent objects during the travel of the truck.

A coupling member 45 in the form of an angle plate having an aperture 45a in the projecting flange thereof, is secured to the central part of the rear transverse frame member 10ᶜ for connection with another truck which may be hitched on behind. At the front end of the truck, there is provided a coupling hook 46 having at this forward end a downturned hook member 46ᵃ which is adapted to engage a coupling member 45 on another truck or a similar coupling member on the rear end of a tractor or other propelling device. The rearwardly diverging arms 46ᵇ of the coupling hook are provided with elongated slots 46ᶜ which are engaged by the transverse pin 47 mounted in the bracket 48 secured to the front cross member 10ᵇ of the frame. By tilting the coupling hook 46 upwardly and then sliding it downwardly on the pin 47, as permitted by the slots 46ᶜ, the coupling hook may be caused to retain the upwardly inclined position shown by dotted lines in Fig. 3 so that the truck may be pushed along without the hook dragging on the floor or pavement. It will be observed that when in this position the hook member is retained against downward movement by projecting beneath the front cross frame member 10ᵇ. For the purpose of retaining pieces of baggage or other objects in place on the truck, the frame may be provided with upwardly extending racks or posts located along the sides or ends or both. In the drawings, there are illustrated a number of racks 50 in the form of U-shaped tubular members having vertical side arms or posts 50ᵃ connected by a transverse or horizontal member 50ᵇ, the parts being rigidly united by means of couplings 50ᶜ. The posts 50ᵃ are adapted to engage socket members 51 which are secured to the frame 10 along both sides and ends of the frame, as illustrated in Fig. 1. The top flanges of the frames 10 are notched out to receive the socket members as shown particularly in Fig. 5 and these socket members 51 are provided with laterally projecting flanges 51ᵃ which are secured to the frame members by means of rivets 52. The cylindrical aperture 51$^b$ of the socket member is then adapted to receive the post 50$^a$ which drops downwardly until it engages the lower inwardly extending flange of the frame member, thereby retaining the rack or side frame 50 in place. These racks or posts may, of course, be removed when desired merely by lifting the posts out of the socket members.

Although one form of the improved truck has been shown and described by way of illustration, it will be understood that it may be embodied in various other forms within the scope of the appended claims.

I claim:

1. A trailer truck comprising a substantial rectangular frame formed of a channel-shaped member having its flanges directed inwardly and its web extending vertically, side rails of angle cross section attached to the top flanges of the side members of said frame, floor boards resting on the lower flanges of said side rails, and wooden jambs mounted on the ends of said floor boards inside of said rails.

2. A trailer truck comprising a substantial rectangular frame formed of a channel-shaped member having its flanges directed inwardly and its web extending vertically, side rails of angle cross section attached to the top flanges of the side members of said frame, floor boards resting on the lower flanges of said side rails, and wooden jambs resting on said floor boards in contact with the upper parts of the upwardly extending flanges of said side rails.

3. A trailer truck comprising side frame members and end frame members of channel cross section having flanges directed inwardly, side rails of angle cross section each having one flange secured to the upper flange of one of said side frame members and having another flange extending upwardly therefrom, floor boards having their ends resting on said lower flanges of said side rails and extending transversely between said side frame members, and jambs secured along the ends of said floor boards and having their upper surfaces lying flush with the upper edges of the vertical flanges of said side rails.

4. A trailer truck comprising side frame members and end frame members of channel cross section having flanges directed inwardly, side rails of angle cross section each having one flange secured to the upper flange of one of said side frame members and having another flange extending upwardly therefrom, floor boards having their ends resting on said lower flanges of said side rails and extending transversely between said side frame members, and jambs secured along the ends of said floor boards and having their upper surfaces lying flush with the upper edges of the vertical flanges of said side rails, said side rails extending beyond said floor jambs at the corners of the truck and having the upper parts of said extending portions cut away so that the upper edges thereof lie flush with said floor boards beyond the ends of said jambs.

5. A trailer truck comprising a substantially rectangular frame formed of a channel-shaped member having its flanges directed inwardly and its web extending vertically, side rails of angle cross section attached to the top flanges of said side frame members and having upwardly extending flanges located in alignment with the webs of said side frame members, floor boards resting on the upper flanges of said side rails and abutting against the vertical flanges of said side rails, and wooden jambs secured to the upper sides of the end portions of said floor boards and abutting against the vertical flanges of said side rails with their upper surfaces flush with the upper surfaces of said side rails and constituting the uppermost portions of the truck.

In testimony whereof, I have subscribed my name.

WERNER ZEINDLER.